(No Model.) 2 Sheets—Sheet 2.
G. VALIANT & C. DANCEL.
MECHANISM FOR STAMPING OR CUTTING OUT BUTTON HOLE FLIES.
No. 385,219. Patented June 26, 1888.
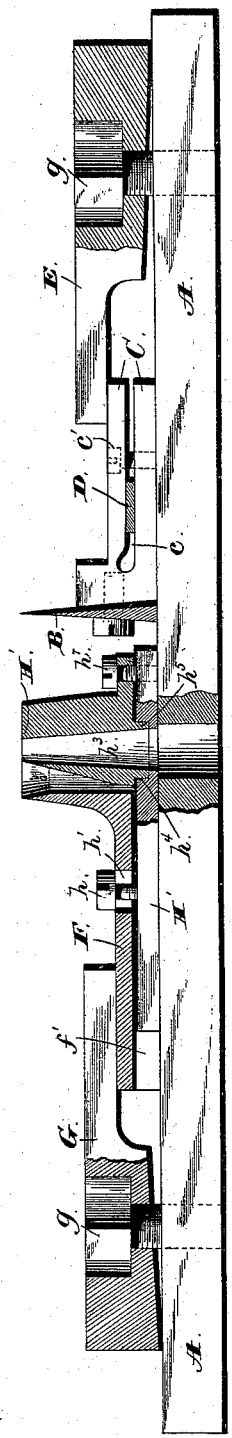
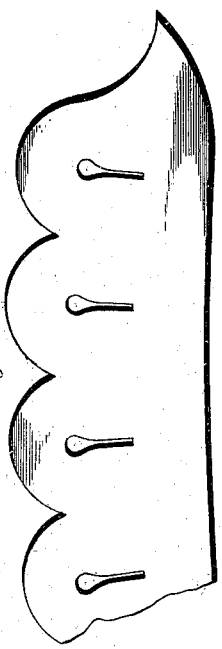
Witnesses:
Jas. E. Hutchinson.
Henry C. Hazard.
Inventors
George Valiant and
Christian Dancel
by Prindle and Russell
their Attorneys

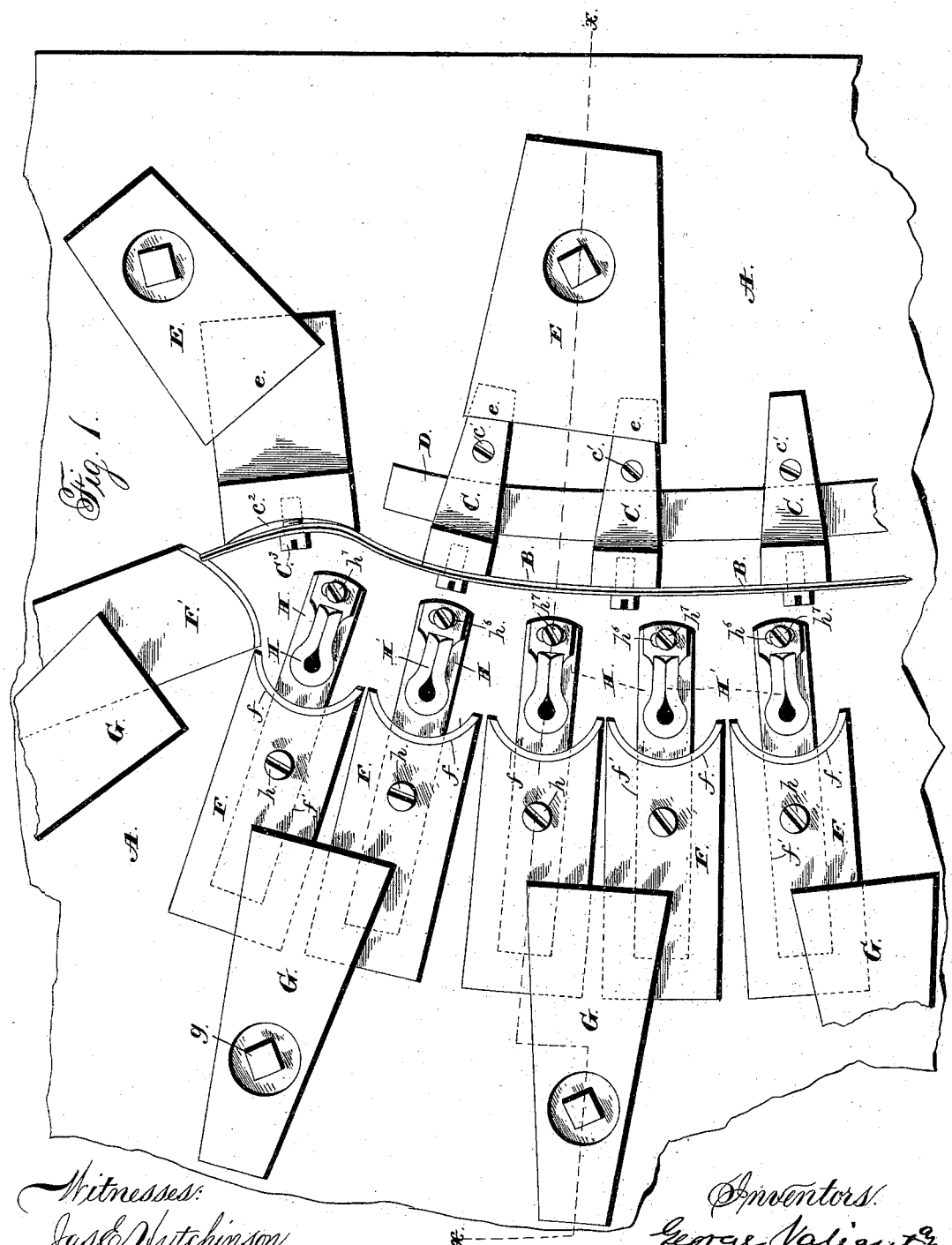

UNITED STATES PATENT OFFICE.

GEORGE VALIANT, OF TORONTO, ONTARIO, CANADA, AND CHRISTIAN DANCEL, OF NEW YORK, N. Y.

MECHANISM FOR STAMPING OR CUTTING OUT BUTTON-HOLE FLIES.

SPECIFICATION forming part of Letters Patent No. 385,219, dated June 26, 1888.

Application filed August 4, 1887. Serial No. 246,106. (No model.)

*To all whom it may concern:*

Be it known that we, GEORGE VALIANT, of Toronto, county of York, Province of Ontario, Canada, and CHRISTIAN DANCEL, of New York city, in the county of New York, and in the State of New York, have invented certain new and useful Improvements in Mechanism for Stamping or Cutting Out Button-Hole Flies; and we do hereby declare that the following is a full, clear, and exact description thereof, reference being had to the accompanying drawings, in which—

Figure 1 shows a plan view of our improved fly-cutting and button-holing mechanism; Fig. 2, an enlarged section of the same on line $x\,x$ of Fig. 1; Fig. 3, a detail bottom plan view of one of the button-hole cutters; Fig. 4, a detail plan view of the slide for carrying a button-hole cutter with such cutter removed, and Fig. 5 a portion of a fly as cut out by our mechanism.

Letters of like name and kind refer to like parts in each of the figures.

The object of our invention is to provide improved mechanism for stamping or cutting out button-hole flies; and to this end our invention consists in the mechanism and in the construction, arrangement, and combination of the parts thereof, as hereinafter specified.

By our mechanism or apparatus, as hereinafter set forth, and shown in the drawings, a fly of any desired size, shape, and curvature, provided with the desired button-holes and scallops, can be stamped or cut out at one operation.

As button-holes for boots and shoes vary greatly both in size, curvature, and shape and in the dimensions and number of the scallops, it would not be commercially practicable to have a die made for each size and shape of fly desired.

Our cutting mechanism is easily adjustable, so that it can be arranged to cut out almost any desired style or form of fly with its proper or suitable button-holes and scallops.

In the accompanying drawings there is shown a portion only of the entire mechanism needed for cutting out and finishing a whole fly. From this portion shown the construction and arrangement of the whole mechanism can be clearly understood, as the rest of said mechanism not shown is made up of duplicates and continuations of the devices appearing in the drawings.

A designates the table or support for receiving and holding the various parts of the mechanism. Resting upon this table is the flexible knife B, for cutting out the attaching edge of the fly. The desired curvature is given to this knife, and it is held as curved by the blocks or slides C C, resting and held in place on the table, as set forth hereinafter. Each of these blocks is at one end fastened to the outer side of the knife, and has its outer end slit or slotted, as shown, on a horizontal plane. The slots $c\,c$ thus made in the sliding pieces or blocks receive the guide-strip D for holding the pieces as adjusted relatively to each other. A set-screw, $c'$, for each piece or block C serves to draw the portions of the block above and below the strip D together, so as to grip or clamp the latter.

To give the upper portion or arm of the block a slight spring to facilitate the clamping and unclamping of the guide-strip, the inner end of slot $c$ is cut out or enlarged, as shown in Fig. 2.

At C' is shown a single slide block or piece not clamped to guide D. It is near the end of the flexible knife, where the latter has to be given a sharp curvature in order to cut out the end portion of the attaching edge of the fly properly, and is made on the face of its end toward the knife concave, as shown at $c^2$. A screw, $c^3$, passing through the knife and tapped into the concave end of the block, serves to draw the portion of the knife between the ends or sides of the concavity in the block inward, so as to cause the knife at that point to correspond in curvature as nearly as desired with the curvature of said concavity of the block end.

A clamp, E, having the arm or portion $e$ overlapping the outer portion of block C', serves to clamp the latter down in place upon table A and hold it as adjusted. A set-screw passing through the body of clamp E and tapped into the table serves to force and hold the clamp down in engagement with the block. Similar clamps with set-screws are, as shown, provided for clamping and holding the other slide pieces or blocks, C C, in place as adjusted on the table. A separate slide piece or block like block C', and operating in the same way, can be provided at or near the other end of the knife B (not shown in the drawings) if a sharp curvature of the knife at that point be desired in cutting out the attaching edge of the fly.

In adjusting or setting the flexible knife for use in cutting out a strip the set-screws $c'$ $c'$ are loosened, so as to unclamp the guide D, and the blocks or slide-pieces C C are so adjusted with reference to each other as to give the desired curvature to the body or main portion of the knife. Said blocks are then fastened as adjusted with relation to each other by screwing in screws $c'$ $c'$ again, so as to clamp the slide-pieces securely to the guide-strip. The curvature of the knife at and near its end is adjusted by screwing in or loosening the screw $c^3$ on block C', as set forth hereinbefore.
The curvature of the knife having been adjusted as desired, the knife is secured in place on the table by the clamps E engaging blocks C C and C' and clamping them against the table-surface.
For cutting out the outer edge of the strip with its curves and scallops we provide a series of adjustable cutters, each one provided with an edge adapted to cut a portion of the curve of the outer fly-edge or one of the scallops.
Each of the scallop-cutting devices consists of a slide or block, F, having the cutting-edge $f$ of the proper curvature and shape to cut one scallop. These slides or blocks are held in place on the table A by the clamps G G, provided with the clamping-screws $g$ $g$. Said clamps operate to hold the slides F F in the same way as the clamps E engage and hold the flexible knife-adjusting blocks C C.

For cutting the outer edge of the fly at and near its end there is provided a slide or block, F', having the cutting-edge corresponding in curvature with the end portion of the outer edge of the desired fly. A clamp G, with screw $g$, is also provided to hold this block as adjusted on the table.

With the separate cutter-carrying slides and the clamps, as described above, the slides can obviously be adjusted to suit any width and configuration of the fly to be cut and fastened as adjusted for the fly-cutting.

In order to cut out the series of button-holes at the same time that the fly is cut out and the scallops made, there is provided a series of slides, H H, each provided with a knife or cutter, H', adapted to cut a button-hole of the desired shape. Each of said slides H H has a portion extending into and guided in a longitudinal groove, $f'$, in the under side of one of the scallop-cutter slides F F. The slides H H are thus made longitudinally adjustable with reference to slides F F to bring the button-hole cutters H' H' nearer to or farther from the curved scallop edges $f f$, so as to cut the button-holes nearer to or farther from the outer edges of the scallops, as desired.

To fasten the button-hole-cutter slides as adjusted with reference to the cutter slides or pieces, each of the former slides is provided with a set-screw, $h$, extending up through a slot, $h'$, in the respective scallop-cutter slide.

As where the curvature of a button-hole fly is changed it is necessary to change the angle of the button-holes somewhat with reference to the scalloped or outer edge of the fly, the button-hole cutters are pivotally attached to their slides H H.

Each of the cutters H' H' consists of a block having on its upper side a cutting-edge so shaped and arranged as to cut out the entire button-hole with the enlargement or rounded opening and the slit or narrow part. To permit the passage of the piece cut out in making the enlargement of the button-hole, an opening, $h^3$, extends down through the cutter-block. Such opening is, in order to insure its ready clearance, made conical or flaring downward, as shown. Through each slide H there is also an opening to form a continuation of the one in the cutter-block.

In the slide concentric with the clearance-openings described is a round recess or depression, $h^4$, adapted to receive the boss $h^5$ on the lower side of the cutter block, about which the cutter H' can be rotated or swung with reference to the slide H, while the openings in the block and slide remain in line. Such turning or swinging of the cutter will obviously change the angle of the button hole with reference to the slide H and the scallop-cutter H'.

In order to provide for fixing the cutter at any adjustment on its pivotal connection with the slide H, the cutter-block is provided with the slot $h^6$ and the slide H with the set screw $h^7$ engaging the slot.

The operation of the mechanism is briefly as follows: The flexible knife is adjusted on the table to the desired curvature of the attaching edge of the fly by adjustment of the slides C C', as hereinbefore described, and is fastened in place on the table A by the clamps E E engaging said slides and clamping them against the table as adjusted. The slide for cutting the curved outer edge of the fly at its lower end and the scallop-cutter slides are then adjusted separately on the table according to the desired width or shape of the fly and fastened by the clamps G G. The button-hole cutters can be adjusted in or out, away from or nearer to the scallop-cutters, by sliding the slides carrying them with reference to the scallop-cutter pieces or slides and fixing them as adjusted by means of set-screws $h$ $h$. If it is desired to change the angle of the button-hole cutters with reference to the scallop-cutters, the set-screws $h^7$ $h^7$ are loosened, the cutter-blocks swung on their pivotal connections with the slides H H, and the screws tightened up again.

The mechanism or apparatus made adjustable, as described, can obviously be adapted readily and easily to cut a fly of any desired size, shape, or curvature, with button-holes of any number and at any desired inclination or direction with reference to the outer edge of the fly.

Where flies for men's boots or shoes are to be cut out, the cutting edges or slides F F, instead of being curved to cut scallops, as shown and described hereinbefore, can be made straight or of any desired shape or form to cut the required outer edge of the fly.

The apparatus or mechanism as described is to be used in a press of any ordinary construction adapted to press the leather or other fabric used for the fly against the cutting devices with sufficient pressure to insure such devices cutting through the same.

The table or plate supporting and holding the various cutters, as described, can be itself a movable one, or the support for the fabric to be cut can be made movable and be moved toward such table to carry the fabric against the cutters.

Having thus described our invention, what we claim is—

1. In combination with a flexible knife, a series of independently-adjustable blocks connected with the knife, whereby the curvature or direction of the knife can be adjusted, substantially as and for the purpose shown.

2. In combination with the flexible knife and a support therefor, a series of independently-adjustable pieces on the support connected with the knife and means for holding the pieces as adjusted on the support, substantially as and for the purpose set forth.

3. In combination with the flexible knife and a support therefor, the adjustable slides attached to the knife and clamps for clamping the slides against the knife-support, substantially as and for the purpose described.

4. In combination with the flexible knife, the series of blocks or slides attached to the knife, a guide, and means for clamping the slides to such guide, substantially as and for the purpose specified.

5. In combination with the flexible knife and the series of blocks or pieces attached to the knife and forked or slotted, the guide embraced within the forks or slots in the blocks and the set-screws for drawing the arms of the forks together to clamp the guide between them, substantially as and for the purpose shown.

6. In combination with the flexible knife, the series of blocks or pieces, each attached at one end to the knife and at the other end slit or slotted, the guide-strip passing through the slots in the blocks, and the set-screws for drawing together the parts of the blocks or pieces on opposite sides of the slot, so as to clamp the blocks to the strip, substantially as and for the purpose set forth.

7. In combination with the flexible knife, the series of slides attached to the knife, a supporting-table, the guide-strip to which the slides are adjustably attached, and the clamps adapted to engage the slides and clamp them to the table, substantially as and for the purpose described.

8. In combination with the flexible knife, a block having a concave face toward the knife and a screw passing through the knife and into the block, substantially as and for the purpose specified.

9. In combination with the flexible knife and a support therefor, the slide provided with a concave face toward the knife, a screw passing through the knife and into the slide between the extremes of the concave face, and a clamp to secure the slide to the support, substantially as and for the purpose shown.

10. In an apparatus for cutting out flies for boots and shoes, in combination with a suitable support, a series of adjustable cutters adapted together to cut out the outer edge of the fly, and the series of button-hole cutters made adjustable to and from the edge-cutters, substantially as and for the purpose specified.

11. In combination with the series of adjustable cutters adapted together to cut out the outer edge of a fly for boots or shoes, the series of button-hole cutters made adjustable to and from the edge-cutters and also as to their angles with reference to such cutters, substantially as and for the purpose set forth.

12. In combination with the series of movable pieces having the scallop-cutting edges, the slides made adjustable with reference to the scallop-cutters and the button-hole cutters on such slides, substantially as and for the purpose described.

13. In combination with the series of pieces, each provided with a scallop-cutting edge and having a longitudinal groove, the slides fitting and guided in these grooves, the button-hole cutters on the slides, and means for fastening the slides at any desired adjustment in the grooves, substantially as and for the purpose shown.

14. In combination with the slides for the button-hole cutters, the cutters pivotally attached to the slides, so as to be capable of being turned thereon, substantially as and for the purpose set forth.

15. In combination with a slide or piece for carrying a button-hole cutter, the cutter pivoted thereon and means for fixing the cutter at any point to which it may be swung on its pivotal connection with the supporting-piece, substantially as and for the purpose described.

16. In an apparatus for cutting out flies for boots and shoes, a flexible knife for cutting the inner or attaching edge of the fly, and adjusting devices for adjusting the curvature of the knife, the series of adjustable pieces carrying cutters to cut the outer edge of the fly and adjustable button-hole cutters, all in combination with each other and with a suitable support, substantially as and for the purpose specified.

In testimony that we claim the foregoing we have hereunto set our hands this 15th day of July, A. D. 1887.

GEORGE VALIANT.
CHRISTIAN DANCEL.

Witnesses:
ARTHUR H. SMITH,
J. BRIERLEY.